US008656676B2

(12) United States Patent
Erban

(10) Patent No.: US 8,656,676 B2
(45) Date of Patent: Feb. 25, 2014

(54) PLATE-SHAPED LAMINATED ELEMENT WITH POSITION FIXING ELEMENT FOR A BONDED ASSEMBLY

(75) Inventor: Christof Erban, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 197 days.

(21) Appl. No.: 10/566,966

(22) PCT Filed: Jul. 29, 2004

(86) PCT No.: PCT/FR2004/050369
§ 371 (c)(1),
(2), (4) Date: Oct. 13, 2006

(87) PCT Pub. No.: WO2005/017297
PCT Pub. Date: Feb. 24, 2005

(65) Prior Publication Data
US 2007/0190282 A1   Aug. 16, 2007

(30) Foreign Application Priority Data

Aug. 8, 2003   (DE) .................................. 103 36 359

(51) Int. Cl.
*E04C 2/54* (2006.01)
*B32B 7/08* (2006.01)
(52) U.S. Cl.
USPC ....... 52/506.05; 52/786.1; 52/173.3; 428/223
(58) Field of Classification Search
USPC ................... 52/506.05, 786.1, 786.11, 788.1, 52/204.593, 235, 204.62, 796.1, 173.3; 428/223; 156/91, 92
See application file for complete search history.

(56) References Cited

U.S. PATENT DOCUMENTS

| | | | | | |
|---|---|---|---|---|---|
| 802,523 | A | * | 10/1905 | O'Dell | 428/223 |
| 1,985,909 | A | * | 1/1935 | Ziepke | 52/204.593 |
| 2,129,167 | A | * | 9/1938 | Cunnington | 428/223 |
| 2,189,293 | A | * | 2/1940 | Ostromislensky | 428/81 |
| 2,359,163 | A | * | 9/1944 | Sherts | 52/204.52 |
| 2,367,035 | A | * | 1/1945 | McConnell et al. | 244/121 |

(Continued)

FOREIGN PATENT DOCUMENTS

| | | | | |
|---|---|---|---|---|
| DE | 4227860 A1 | * | 4/1993 | E04F 13/14 |
| DE | 693 10 389 T2 | | 11/1997 | |

(Continued)

OTHER PUBLICATIONS

Machine translation of DE10054816 A1 to Knaack.*

(Continued)

*Primary Examiner* — Brent W Herring
(74) *Attorney, Agent, or Firm* — Oblon, Spivak, McClelland, Maier & Neustadt, L.L.P.

(57) ABSTRACT

A laminated, plate-shaped element with at least a first and a second substrate, which are joined together at least indirectly by adhesive bonding, and also with at least one support element associated with the first substrate to fasten the laminated element to an infrastructure and active position fastening of the second substrate at least in the event of failure of the bonded joint. The position fastening is active only between the first and second substrates and is placed a certain distance from the edge of the second substrate. The active position fastening is particularly applicable in laminated elements placed in an inclined or vertical mounting position, for example in solar modules with incorporated solar cells.

17 Claims, 1 Drawing Sheet

(56) References Cited

U.S. PATENT DOCUMENTS

| | | | | |
|---|---|---|---|---|
| 2,406,939 A | * | 9/1946 | Boicey | 52/204.62 |
| 2,649,135 A | * | 8/1953 | Prase | 156/65 |
| 2,654,685 A | * | 10/1953 | Voelker | 52/208 |
| 2,834,998 A | * | 5/1958 | Wilder | 52/208 |
| 3,022,870 A | * | 2/1962 | John et al. | 403/267 |
| 3,620,119 A | * | 11/1971 | King | 411/399 |
| 3,881,292 A | * | 5/1975 | Porter | 52/461 |
| 4,004,388 A | * | 1/1977 | Stefanik | 52/204.593 |
| 4,046,933 A | * | 9/1977 | Stefanik | 428/81 |
| 4,139,975 A | * | 2/1979 | Baker | 52/506.02 |
| 4,221,041 A | * | 9/1980 | Hufnagl et al. | 29/512 |
| 4,609,315 A | * | 9/1986 | Briles | 411/43 |
| 4,680,206 A | * | 7/1987 | Yoxon et al. | 428/34 |
| 4,724,638 A | * | 2/1988 | Bezborodko | 52/506.05 |
| 4,793,112 A | * | 12/1988 | Sufke | 52/309.14 |
| 4,861,643 A | * | 8/1989 | Scollard | 428/162 |
| 4,933,227 A | * | 6/1990 | Stewart | 427/192 |
| 4,947,597 A | * | 8/1990 | Simpson | 52/208 |
| 5,069,014 A | * | 12/1991 | Kubbutat | 52/235 |
| 5,096,255 A | * | 3/1992 | Leischner | 296/201 |
| 5,106,250 A | * | 4/1992 | Fischer et al. | 411/107 |
| 5,145,744 A | * | 9/1992 | Cartier et al. | 428/423.7 |
| 5,391,411 A | * | 2/1995 | Rowland et al. | 428/34 |
| 5,398,452 A | * | 3/1995 | Schilde et al. | 49/501 |
| 5,533,314 A | * | 7/1996 | Kunert | 52/788.1 |
| 5,598,674 A | * | 2/1997 | Lay et al. | 52/309.1 |
| 5,765,325 A | * | 6/1998 | DeBlock | 52/204.5 |
| 5,897,935 A | * | 4/1999 | Ellis et al. | 428/223 |
| 6,052,965 A | * | 4/2000 | Florentin et al. | 52/786.13 |
| 6,098,364 A | * | 8/2000 | Liu | 52/506.08 |
| 6,105,327 A | * | 8/2000 | Kroll | 52/506.05 |
| 6,138,434 A | * | 10/2000 | Demars et al. | 52/786.13 |
| 6,202,377 B1 * | | 3/2001 | Krieger | 52/489.1 |
| 6,436,493 B1 * | | 8/2002 | Asano et al. | 428/34 |
| 6,461,704 B1 * | | 10/2002 | Matsco et al. | 428/38 |
| 6,609,350 B1 * | | 8/2003 | Weber | 52/784.1 |
| 6,730,841 B2 * | | 5/2004 | Heckeroth | 136/251 |
| 6,846,039 B2 * | | 1/2005 | Lewno | 296/201 |
| 6,877,204 B1 * | | 4/2005 | Schnabel et al. | 29/512 |
| 6,883,287 B2 * | | 4/2005 | Niese et al. | 52/403.1 |
| 6,915,987 B2 * | | 7/2005 | Fisher et al. | 244/129.3 |
| 7,410,181 B2 * | | 8/2008 | Colon | 280/87.042 |
| 7,686,552 B2 * | | 3/2010 | Bohnet et al. | 411/82 |
| 2002/0112432 A1 * | | 8/2002 | Spivey | 52/582.1 |
| 2003/0150183 A1 * | | 8/2003 | Egan | 52/506.05 |
| 2004/0049999 A1 * | | 3/2004 | Krieger | 52/245 |
| 2005/0042433 A1 * | | 2/2005 | Jones et al. | 428/292.1 |
| 2006/0144005 A1 * | | 7/2006 | Tonyan et al. | 52/653.1 |
| 2006/0265988 A1 * | | 11/2006 | Fujito et al. | 52/511 |
| 2007/0051452 A1 * | | 3/2007 | Ward et al. | 156/101 |
| 2007/0079861 A1 * | | 4/2007 | Morali | 136/244 |
| 2007/0101679 A1 * | | 5/2007 | Harthcock et al. | 52/782.1 |
| 2007/0264472 A1 * | | 11/2007 | Bozhevolnaya et al. | 428/156 |
| 2008/0245404 A1 * | | 10/2008 | DeLiddo | 136/251 |

FOREIGN PATENT DOCUMENTS

| | | | |
|---|---|---|---|
| DE | 197 51 124 C1 | 4/1999 | |
| DE | 100 54 816 A1 | 1/2002 | |
| EP | 277 535 A2 | 8/1988 | |
| EP | 0 314 120 | 5/1989 | |
| EP | 0 319 695 A1 | 6/1989 | |
| EP | 0 552 101 B1 | 7/1993 | |
| EP | 595 062 A1 | 5/1994 | |
| EP | 608063 A2 * | 7/1994 | E06B 3/66 |
| EP | 0 918 119 | 5/1999 | |
| JP | 05018088 A * | 1/1993 | E04F 13/08 |
| WO | 01/38680 | 5/2001 | |

OTHER PUBLICATIONS

Machine translation of EP0595062 A1 to Vornholt.*

* cited by examiner

PLATE-SHAPED LAMINATED ELEMENT WITH POSITION FIXING ELEMENT FOR A BONDED ASSEMBLY

BACKGROUND OF THE INVENTION

I. Field of the Invention

The invention relates to a laminated, plate-shaped element with position fastening, comprising at least a first and a second substrate, which are joined together, at least indirectly, by adhesive bonding, and also with at least one support element associated with the first substrate in order to fasten the laminated element to an infrastructure and active position fastening of the second substrate, at least in the event of failure of the bonded joint.

II. Description of Related Art

Laminated, plate-shaped elements, which are composed of at least two substrates and of an adhesive layer joining the elements together by surface bonding or of a spacer frame adhesively bonded to the two substrates, may be fastened in a known manner without a frame to structures, by fastening, to the infrastructure, only the substrate facing the building. Examples of such elements and of their fastenings may be found in Documents EP 277 535 A2 and EP 595 062 A1. The Applicant sells and uses support elements of this type (undercut blind hole and anchoring of a support element in the form of a bolt with undercut dowel) with the name SGG Point XS.

For safety reasons, purely adhesive fastening of the substrate placed on the outside is, however, most of the time supplemented with mechanical means, which form at least one position fastening of the external substrate in the event of failure of the bonded joint. According to Document DE 693 10 389 T2 (corresponding to EP 552 101 B1), a substrate close to the building of a curtain wall element made of insulating glazing is fastened by means of discrete supports mounted on the latter, while the outer substrate, away from the building, is held in place only by the spacer frame and the adhesive bonding. In order to ensure the positioning of the outer substrate, metal clips are provided here that are fastened to the discrete supports and catch, underneath, on the lower edges of the two substrates.

Document EP 319 695 A1 discloses position fastening for curtain wall elements made of insulating glazing, which are entirely bonded to the infrastructure in the form of what is called "structural glazing". In a variant, the position fastening is formed by pins, which catch in undercut blind holes in the outer substrate, away from the building, of the insulating glazing elements and are retained by the infrastructure in the event of failure of the bonded joint.

Document DE 197 51 124 C1 describes a laminated element with supports that pass through one of the substrates and are fastened by means of a undercut dowel in a undercut blind hole in the second substrate. A similar solution is disclosed in Document DE 100 54 816 A1, in which a pin-type support is fastened by means of a curable filling compound in a blind hole in the second substrate.

BRIEF SUMMARY OF THE INVENTION

It is an object of the invention to provide a laminated, plate-shaped element for the building industry, with simple position fastening.

The secure mechanical fastening of the first substrate suffices in principle as the basis for indirect relative position fastening of the second substrate. Preferably, the relative position fastening of the two substrates is provided by fitting at least one fastening element that passes through the joint plane between the two substrates and engages in the two substrates. The fastening acts in a particularly discrete manner and independently of the supports for the laminated element.

It goes without saying that the number of fastening elements to be installed per laminated element depends on the area of the laminated elements, possibly on the mounting position (vertical, inclined or horizontal) and also on the weight of the substrate to be fastened.

In principle, insulating glazing elements could admittedly also be provided with such position fastening elements. A preferred use of these position fastening elements applies, however, to laminated substrates, comprising two substrates and an adhesive layer joining the latter together by surface bonding. The rest of the description therefore relates to this type, without in any way wishing to exclude other forms thereof.

The laminated elements may be equipped with other functional elements, particularly electrical elements, for example solar cells housed between the substrates, heating layers, antenna elements or alarm elements. It goes without saying that the position fastening or alternatively the corresponding fastening elements must always be installed so as not in any way to impede the aforementioned functional elements.

Although this is not absolutely necessary, but nevertheless highly recommended, the actual support for the laminated elements on an infrastructure catches on only one of the substrates, in particular advantageously only that face of the substrate located on the opposite side from the functional elements. Consequently, there may be freedom of choice in where to place them, taking into account the requirements imposed by the static and dynamic loads and also by the infrastructure. The laminated element face left free in the mounting position therefore remains intact.

Laminated or insulating glazing elements, which are in turn adhesively bonded to an infrastructure (structural glazing), may however also be provided with the position fastening according to the invention.

Similarly, staged elements, in which one (larger) substrate is held in place via its edge at discrete points by clips onto an infrastructure or in a frame, while a second (smaller) substrate is only bonded to the first substrate, may receive a position fastening element of the type described here. Another application possibility relates to elements attached at discrete points to the edge, in which elements the substrate to be fastened has, in the region of the supports, only recesses facing the fastened substrate of the same size.

Finally, it is also possible to provide such position fastening directly between a spacer means adhesively bonded to the two substrates, whatever the shape of a peripheral frame, or only in segments, and one or both substrates, that it joins together. This embodiment may be applied not only to the usual spacer means in the form of solid (metal, plastic, ceramic, glass) sections but also to the spacer means, likewise known per se, produced in situ, for example by extrusion or by injection molding. It is even conceivable for the position fastening to be placed again between the two substrates to be fastened, one relative to the other, by passing through the spacer means. Of course, in the case of an insulating glazing element with an intermediate space between the substrates that are sealed off in a gastight manner, measures must be taken to ensure that the position fastening does not compromise the sealing of the arrangement.

It goes without saying that the use of the position fastening according to the invention does not exclude support elements on the infrastructure also supporting the second substrate in addition to the first substrate.

As materials for the laminated elements, it is possible to consider, beside transparent materials like glass, preferably toughened or partially toughened glass, and plastic, other materials such as metal sheets, stone or marble plates, etc. Of course, any pairs of different materials may also form a laminated element of the type discussed here.

It is not absolutely necessary for the fastening elements to be firmly joined to the two substrates (or possibly with the spacing means and the substrate or substrates), even though their simple separation from the laminate must be prevented. In the case of position fastening, a certain initial movement is quite admissible. The fastening elements have only to reliably prevent the propagation of this movement beyond the extent still acceptable. The bond joint will not yield suddenly, but via a creep process, thus retaining a certain residual adhesion. The minimum requirement imposed on the fastening elements is therefore not guaranteeing any more the adhesion of the two substrates perpendicular to their surface extension. However, they may also fulfill this condition with forming and/or appropriate fastening to or in the substrates.

According to a first embodiment, a fastening element is introduced into a drillhole passing through the two substrates, and preferably in such a way that it terminates flush with the outer faces of the two substrates. Modern manufacturing conditions make it possible, even in substrates that are drilled before the manufacture of the laminated element (laminated substrate) and are then thermally toughened in order to increase their mechanical strength, to produce isolated drillholes with sufficient positional precision in such a way that they are aligned along any one axis with small deviations in the laminate of the two substrates. Consequently, it is possible to mount pin-shaped fastening elements of the type considered here a posteriori at little expense in the finished laminated element.

It goes without saying that the adhesive layer between the two substrates must also have a recess for passage of the fastening element. This recess should possibly have already been made before assembly, or subsequently, by appropriate means, when the fastening element has been positioned only after assembly of the substrates.

If for example a thermoplastic adhesive sheet is used, a fastening element may then be heated above the melting point of the adhesive sheet before it is installed and then pushed right in through the adhesive sheet. With this method, it would be unnecessary to make a separate hole in the adhesive sheet and a fastening element would be fastened axially and radially by means of the adhesive layer that adheres thereto.

If the two substrates are bonded together by casting a curable casting resin (as is widely used in the case of solar modules), a fastening element may already have been introduced before the casting and then fastened axially and radially with the casting resin, if sufficient adhesion is guaranteed between the fastening element and the casting resin.

The fastening elements may also be fastened in another manner to at least one of the two substrates, for example by interlocking and/or by separate bonding. If fastening elements made of plastic or soft metal (for example pure aluminum) are used, these may, by intrinsic elastic or plastic deformation, compensate both for any undersize of the drillhole in the substrates and slight lateral offset of the individual drillholes. Elastically or plastically deformable fastening elements are for example collet sleeves (longitudinally slit hollow pins) or pins provided with longitudinal or transverse external ribs. Thanks to their elastic and/or plastic deformation, the respective fastening elements are radially and axially fastened by them being clamped in the recesses provided for this purpose.

According to another embodiment, one of the substrates has a through-drillhole and the other substrate a blind hole in alignment with the latter. The fastening element is introduced before or after the two substrates are assembled, preferably again in such a way that it does not project onto the mouth of the through-drillhole. It may be mounted and/or fastened in the manner described above.

According to yet another embodiment, a fastening element may, according to the invention, be housed entirely in the laminated element, in the manner of a parallel key, which is well known in the construction of machines. The outer faces of the laminated element may in this case remain intact; likewise, it is possible to dispense with special fastening of the fastening element. However, it is necessary to make, in the two inner faces of the two substrates in the laminate, recesses (grooves, blind holes, etc.) with positional precision as high as possible, and the fastening element must have already been introduced before the plates are assembled by bonding. This provides one solution of the problem, which admittedly is particularly attractive looking from the outside, because it is barely perceptible, however its implementation is relatively expensive.

This could be implemented in such a way that, after the recesses have been made in the two substrates to be assembled, the first substrate is initially placed with the recess facing upward, the fastening element is introduced into the recess, then an adhesive film is possibly laid on top, and finally the second substrate is placed in such a way that the fastening element is introduced into the recess in the second substrate. Next, the bonded laminate may be manufactured. During adhesive bonding with a casting resin, a spacer frame is introduced in a known manner between the two substrates, and the intermediate space thus formed is filled with the casting resin.

The fastening elements may themselves be made of any (sufficiently strong) material and have any shape whatsoever, for example with a cylindrical, elliptical or polygonal cross section, they may be hollow or solid, smooth or ribbed, with steps, etc. Of course, the dimensions of the recesses in the substrates and of the fastening elements must be matched to one another in such a way that, should the substrate to be fastened creep, any extraction of the fastening element under a shear load is practically excluded. Moreover, no substantial load is exerted on the individual fastening element, so that it does not have to be exaggeratedly strong.

Other details and advantages of the subject of the invention will become apparent from the drawings of an illustrative example and from its detailed description that follows.

BRIEF DESCRIPTION OF THE DRAWINGS

In these drawings, which are simplified representations with no particular scale.

DETAILED DESCRIPTION OF THE INVENTION

Figure 1:
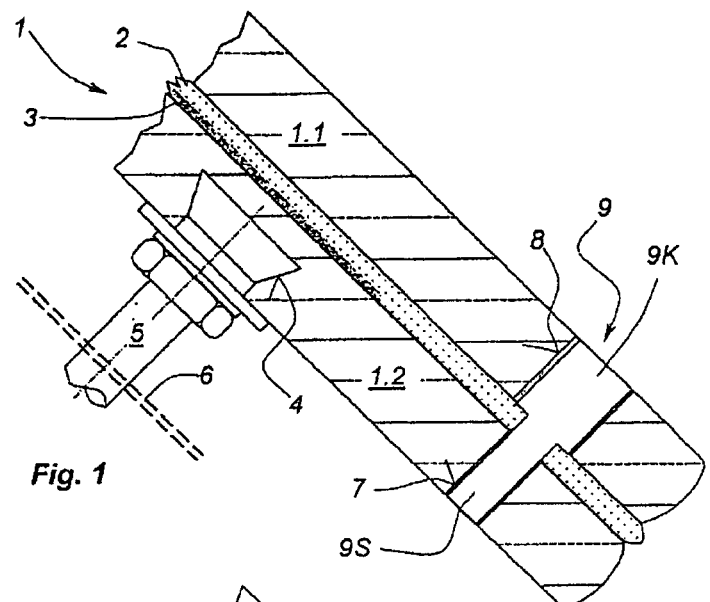
FIG. 1 is a sectional view of a first embodiment of a laminated element according to the invention, in the region of a support and of a position fastening element.

In FIG. 1, a laminated element 1 is composed of a first substrate 1.1 and a second substrate 1.2, here both made of glass. An adhesive layer 2 joins the two substrates together over their entire area. The substrate 1.2, placed below in the drawing bears, on its face turned toward the adhesive layer 2, a functional element 3 schematically indicated solely in the form of a coating. In a preferred embodiment of the present invention, the functional element is composed of a number of photovoltaic solar cells, and the laminated element 1 forms or comprises a solar module.

That face of the substrate 1.2 which is located to the outside/underneath and on the opposite side from the functional element 3 is provided with an undercut blind hole 4. Anchored into the latter, in a known manner using an undercut dowel, is a bolt-shaped support element 5, for example of the SGG Point XS type, with which the laminated element 1 may be fastened to an infrastructure 6 shown solely by a broken double line. The infrastructure may be a building wall, a support framework, a bridge or deck element, and the like.

The support element 5 does not penetrate as far as the plane of the adhesive layer 2 and of the functional element 3. It can therefore be positioned freely in the region of the surface of the laminated element 1, which surface is covered by the functional element 3. It goes without saying that several support elements 5 of this type will be provided, depending on the size and the weight of the laminated element 1, which support elements together form the mechanical support for the laminated element 1 on the infrastructure 6.

It is repeated that this discrete fastening indicated by way of example does not exclude the combination of position fastening with other possible ways of fastening laminated elements of this type and with laminated elements that include a spacing means.

In the "solar module" application case, the laminated element 1 is as a rule mounted in an inclined position, obliquely with respect to the solar radiation, as is indicated here, for example on a building roof and/or on a support framework. Consequently, the adhesive layer 2 and the upper substrate 1.1 in the mounted state are permanently subjected to a downward sliding force. Of course, this force is taken up by the support elements 5. However, solar modules may by their nature be very hot in service, so that creep of the adhesive layer 2 cannot be completely excluded.

Close to the right-hand outer edge, to the outside of the surface region covered by the functional element 3, the substrate 1.2 is provided with a through-drillhole 7. Substantially in axial alignment with the latter is a through-drillhole 8 made in the substrate 1.1. The drillhole 8 has a larger diameter than the drillhole 7. A fastening element 9 with a thicker head part 9K and a shank part 9S is introduced into the two drillholes 7 and 8 in such a way that the step at the transition from the head part 9K to the shank part 9S bears on the adhesive layer 2 (or is also embedded in the latter). The shank part 9S passes through the plane of the adhesive layer 2 and engages in the drillhole 7 in the substrate 1.2. The head part 9K is located in the larger diameter drillhole 8 in the substrate 1.1.

The length of the fastening element 9 corresponds approximately to the total thickness of the laminated element 1. Consequently, it ends up at least approximately flush with both external faces of the substrates 1.1 and 1.2 and does not project beyond them. It is preferably fastened in the drillholes 7 and 8 by means of an adhesive, this fastening constituting only protection against dropping.

In the event of failure of the bonded joint, or alternatively should the adhesive layer 2 creep, the upper substrate 1.1 may in any case move relative to the substrate 1.2 until the wall of its drillhole 8 touches the fastening element 9. In this way, mechanical position fastening is established, by shape complementarity, of the bonded assembly held in place by clamping or, depending on the case, by the material, which also meets the requirements regarding the construction.

Figure 2:
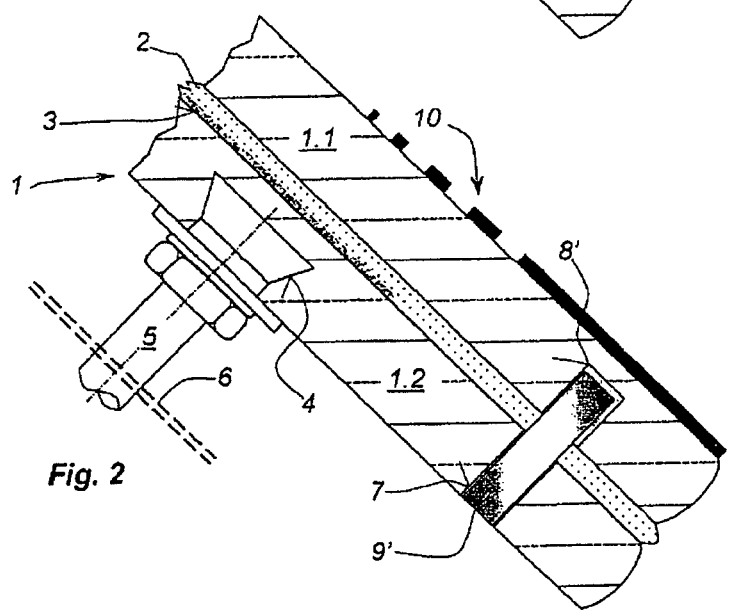
FIG. 2 shows a second embodiment, similar to FIG. 1, with an alternative form of the position fastening element.

FIG. 2 shows a variant of the position fastening. Here, only the substrate 1.2 has a through-drillhole 7, while a blind hole 8' is provided in the substrate 1.1. The blind hole is again placed at least approximately in axial alignment with the through drillhole 7. Here, the two drillholes have substantially the same diameter.

A cylindrical fastening element 9 is again introduced as position fastening into the two drillholes 7 and 8' in such a way that it passes through the plane of the adhesive layer 2. It is fastened in the drillholes by means of a heat-resistant adhesive. The outer surface of the upper substrate 1.1 remains intact, with no hole, in the region of the position fastening. The length of the fastening element 9 is matched to the depth of the drillholes 7 and 8' in such a way that the element can be mounted in the fully pushed-in position without projecting beyond the lower face of the substrate 1.2.

For purely visual masking of the position fastening, the laminated element 1 may be provided, in the region of the edge on the surface of the substrate 1.1, with an opaque colored layer 10 which terminates in a pattern of spots toward the middle of the substrate. The colored layer 10 may for example be deposited by screen printing and baked while the substrate 1.1 is being toughened. Of course, in the "solar module" application case, it must be placed on the outside of the region of the surface covered by the solar cells.

In an alternative embodiment shown in FIG. 2, the blind hole 8' could be placed in the lower substrate 1.1 and the through-drillhole in the substrate 1.2. That end face of the fastening element 9 turned toward the outside would then advantageously be colored in the same tint as the colored layer 10.

According to another embodiment (not shown in FIG. 2), the fastening element would even be a little shorter than that shown here, and the drillhole in the substrate 1.1 would also be a blind hole. The fastening element 9 must then be placed in the aligned recesses/blind holes before the bonding is carried out.

It goes without saying that, just as was mentioned in the case of the support elements, several individual fastening elements illustrated in the figures as embodiment examples may be provided, when the size and the weight of the laminated elements so require. However, as a general rule two fastening elements will suffice.

One application of the position fastening to a laminated element provided with a spacing means may also be simply accomplished as in FIGS. 1 and 2.

Instead of bonding over the entire surface with the adhesive layer 2, in this case a relatively narrow spacing means is formed, this being bonded to the latter only along the edge of the two substrates. The spacer means may either be fully penetrated by a fastening element, just like the adhesive layer 2, in such a way that there is relative position fastening between the two substrates 1.1 and 1.2. However, it is also possible to provide fastening elements only between the spacing means and one or both substrates. In each of these cases, the fastening elements pass through the bonded joint between the spacing means and the substrate in question, and they support the latter should there be any failure of the bonded joint.

The invention claimed is:

1. A laminated, plate-shaped element, comprising:
   at least a first and a second glass substrate, which are joined together, at least indirectly, by a layer of thermoplastic or curable casting resin adhesive bonding to form a bonded joint;
   at least one support element positioned in a recess in the first glass substrate to fasten the laminated element to an infrastructure, the recess only extending from one surface of the first glass substrate to an inner portion of the first glass substrate and not extending to the surface joined to the second glass substrate by the layer of adhesive bonding; and at least one active position fastening of the second glass substrate relative to the first glass substrate, at least in the event of failure of the bonded joint, wherein the at least one active position fastening is active, independently of the at least one support element, only between the first and second glass substrates and is placed a certain distance from edges of the first and second glass substrates, the at least one active position fastening comprises at least one fastening element passing through the layer of adhesive bonding between the first and second glass substrates and engaging in a recess in each of the first and second glass substrates, the recess in the second glass substrate emerging only in a face of the second glass substrate which is turned toward the adhesive, the recess being a blind hole or a groove, the at least one support element is separate from the at least one active position fastening, and the at least one position fastening does not act as, nor is connected to, a support element for fastening the laminated element to an infrastructure.

2. The laminated element as claimed in claim 1, wherein the recess in the first glass substrate is a through-drillhole.

3. The laminated element as claimed in claim 1, wherein the at least one fastening element is a round tenon with a head part and a shank part.

4. The laminated element as claimed in claim 1, wherein the at least one fastening element is a cylindrical pin.

5. The laminated element as claimed in claim 1, wherein the at least one fastening element does not project from outer surfaces of the first and second glass substrates.

6. The laminated element as claimed in claim 1, further comprising visual masking in a region of the at least one active position fastening.

7. The laminated element as claimed in claim 1, wherein the at least one fastening element for the at least one active position fastening is fastened by adhesive bonding in a recess into which the at least one fastening element is introduced.

8. The laminated element as claimed in claim 1, wherein the at least one fastening element for the at least one active position fastening is immobilized by adhesion in a recess into which the at least one fastening element is introduced.

9. The laminated element as claimed in claim 8, wherein the at least one fastening element comprises at least one element configured to deform elastically or plastically upon introduction of the at least one fastening element into the recess.

10. The laminated element as claimed in claim 1, wherein the at least one fastening element for the at least one active position fastening is fastened by an assembly of the first and second glass substrates with the adhesive, in a recess into which the at least one fastening element is introduced.

11. The laminated element as claimed in claim 1, further comprising at least one functional element placed between the first and second glass substrates.

12. The laminated element as claimed in claim 11, wherein the at least one functional element is a coating comprised of a plurality of photovoltaic solar cells.

13. The laminated element as claimed in claim 1, wherein the at least one support element associated with the first glass substrate comprises a support bolt, which is fastened by adhesion, by interlocking, or by an undercut dowel, in a blind hole in the glass substrate emerging on the opposite side from the adhesive.

14. The laminated element as claimed in claim 1, wherein an edge of the laminated element is joined to the at least one support element.

15. The laminated element as claimed in claim 1, further comprising:

an opaque colored layer in a region of an edge on a surface of the first glass substrate.

16. The laminated element as claimed in claim 1, wherein at least one of the first and second glass substrates includes an outer surface of the laminated element being flush with a respective end of the at least one fastening element.

17. A laminated, plate-shaped element, comprising:

at least a first and a second substrate, which are joined together, at least indirectly, by a layer of thermoplastic or curable casting resin adhesive bonding to form a bonded joint;

at least one support element associated with the first substrate to fasten the laminated element to an infrastructure; and at least one active position fastening of the second substrate, at least in the event of failure of the bonded joint, wherein the at least one active position fastening is active, independently of the at least one support element, only between the first and second substrates and is placed a certain distance from edges of the first and second substrates, the at least one active position fastening comprises at least one fastening element passing through a plane of a bonded assembly between the first and second substrates and engaging in a recess in each of the first and second substrates, the recess in the second glass substrate emerging only in a face of the second glass substrate which is turned toward the adhesive, the recess being a blind hole or a groove, the at least one support element is separate from the at least one active position fastening, and the at least one position fastening does not act as, nor is connected to, a support element for fastening the laminated element to an infrastructure, and the at least one support element associated with the first substrate comprises a support bolt, which is fastened by adhesion, by interlocking, or by an undercut dowel, in a blind hole in the first substrate emerging on the opposite side from the adhesive.

* * * * *